US006202092B1

(12) United States Patent
Takimoto (10) Patent No.: US 6,202,092 B1
(45) Date of Patent: Mar. 13, 2001

(54) PRINT SYSTEM MANAGING THE SECURITY OF A PRINTER SHARED ON A NETWORK (75) Inventor: Gishin Takimoto, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 08/976,466

(22) Filed: Nov. 24, 1997

(30) Foreign Application Priority Data

Nov. 27, 1996 (JP) .................................. 8-315759

(51) Int. Cl.[7] .................................................. G06F 15/16
(52) U.S. Cl. .......................... 709/225; 358/1.13; 358/1.15
(58) Field of Search .................................. 709/228, 225, 709/226; 395/114, 112; 358/1.13, 1.11, 1.12, 1.14, 1.15

(56) References Cited

U.S. PATENT DOCUMENTS 5,513,126 * 4/1996 Harkins et al. ...................... 709/228
5,638,497 * 6/1997 Kimber et al. ...................... 395/114
5,819,047 * 10/1998 Bauer et al. ......................... 709/217
5,903,716 * 5/1999 Kimber et al. ...................... 395/114

FOREIGN PATENT DOCUMENTS 7-73128    3/1995   (JP) .

* cited by examiner

Primary Examiner—Dung C. Dinh
(74) Attorney, Agent, or Firm—Young & Thompson (57) ABSTRACT Authority of each user to use a printer is set in a security data base with respect to the number of sheets to be printed, kinds of sheets, and special printing functions. A print request, including the number of sheets to be printed, the kinds of sheets, and whether special printing functions are to be used are sent to a security validating device, and the security validating device decides whether authorization to use the printer is to be granted based on the restrictions on the user maintained in the data base and the status of the user. If printing is authorized, after the printing is completed, an editing device updates information on the status of use in the security data base.

12 Claims, 5 Drawing Sheets

| | WOOD FREE PAPER | RECYCLED PAPER | OHP SHEET | DEDICATED FORMAT |
|---|---|---|---|---|
| USER A | 100 | 700 | 0 | 0 |
| | 500 | 1000 | 10 | 0 |
| USER B | 480 | 600 | 0 | 0 |
| | 500 | 1000 | 10 | 0 |
| USER C | 100 | 500 | 0 | 0 |
| | ∞ | ∞ | 10 | 0 |
| ⋮ | ⋮ | ⋮ | ⋮ | ⋮ |

FIG. 3(a)

| | ORDINARY PRINT | COLOR PRINT | PRINT ON BOTH SIDES | "STAPLER" |
|---|---|---|---|---|
| USER A | 100 | 700 | 10 | 0 |
| | 1000 | 100 | 30 | 0 |
| USER B | 100 | 80 | 10 | 0 |
| | 1000 | 100 | 30 | 0 |
| USER C | 100 | 0 | 0 | 0 |
| | 1000 | 100 | 30 | 0 |
| ⋮ | ⋮ | ⋮ | ⋮ | ⋮ |

PRINT SYSTEM MANAGING THE SECURITY OF A PRINTER SHARED ON A NETWORK

BACKGROUND OF THE INVENTION

1. Field of the Invention

The present invention relates to a print system for managing the security of a printer shared on a network, and more particularly, for checking whether users have the authority to print or access the security data.

2. Description of the Related Art

Conventionally, in a security management system of this kind, a printer is managed by a server computer. Upon receipt of a request from a user to print or to read and modify security data in the server computer, the server determines whether the user has the proper authority for the requested service.

Figure 5:
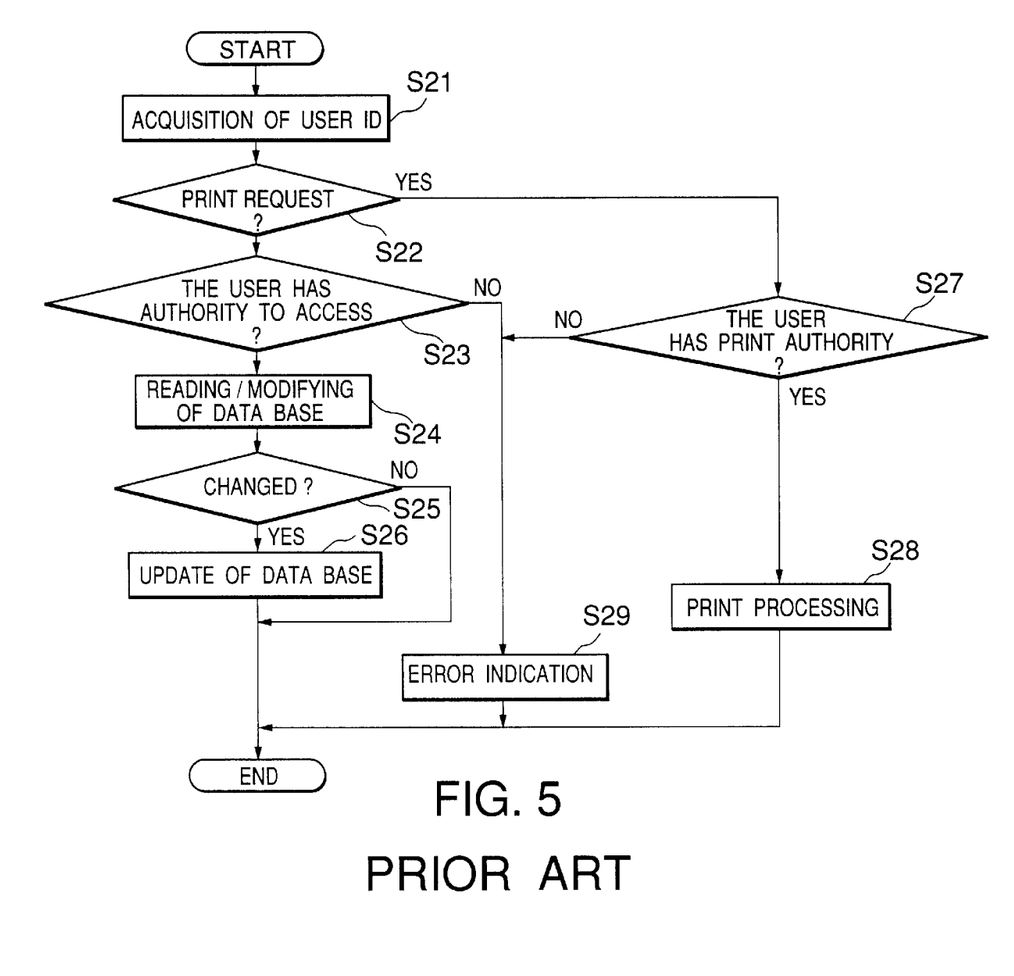
FIG. 5 is a flow chart illustrating operation of a conventional print system.

More specifically, as shown in FIG. 5, with respect to a request from a user for printing or reading and modifying the security data, the server computer first acquires the user ID (identifying information) of the requesting user (step S21 in FIG. 5), and then determines the nature of the request (whether it is a print request) (step S22 in FIG. 5).

If the request is to read and modify the security data, the server computer determines whether the user has authority to access the security data (step S23 in FIG. 5), providing an error indication if the user is unauthorized (step S29 in FIG. 5).

If the user is authorized for such access, the server computer allows the user to read and modify the security data via a user interface (step S24 in FIG. 5). If the security data is thus changed (step S25 in FIG. 5), the server computer saves the changes (step S26 in FIG. 5).

On the other hand, if the request is merely to print, the server computer determines whether the user has print authority (step S27 in FIG. 5), providing an error indication if not (step S29 in FIG. 5). If the user is authorized, the server computer executes print processing (step S28 in FIG. 5).

In addition to the security management system mentioned above, there also exists a system in which the authority to use a printer commonly used on a network is set with respect to each computer on the network. Printing is authorized only with respect to a print request from a computer having the proper authority, and the number of sheets of the print request is counted and recorded so that the print account of each computer on the network may be determined.

In the case of this system, when a print request is made from a computer, the number of sheets of the print request is counted by a print sheet number counting portion, and the count is transferred to a maintenance computer to be recorded. The maintenance computer records the total number of printed sheets with respect to every computer or every department the computers belong to. This technique is disclosed in Japanese Patent Application Laid-Open No. 7-73128.

In the conventional security management systems described above, the required security function only determines whether or not a user may use the printer, and can not place restrictions on the printable number of sheets, the kind of paper, or which paper feeder is to be used. Neither can it restrict use of functions such as color printing, printing on both sides, and enlarged/reduced printing.

Further, although it is known to record the number of printed sheets with respect to each computer or each department the computers belong to, since the number of printed sheets per type of paper or per paper feeder and the number of times double-sided and color printing are used are not recorded with respect to every user, a manager can not determine the cumulative number of such uses, and therefore, can not manage them.

SUMMARY OF THE INVENTION

Accordingly, an object of the present invention is to solve the above problems and to provide a print system in which restrictions can be placed on the cumulative number of pages printed or usable printing function with respect to every user, allowing a manager to monitor use of a shared printer.

According to a print system of the present invention, the print system with a shared printer on a network comprises a data base for, corresponding to user identifying information for specifying a user of the printer, storing restricting information indicating a range of authority to use indicating the printable number of sheets and a usable function for the user with respect to the printer and for storing status of use of the printer by the user, a print validating means for, when a print request to the printer is inputted, based on print content included in the print request and on the user identifying information, referring to the data base and deciding either authorization or non-authorization of printing with the printer with respect to the print request, a print history recording means for, after printing according to the print request is executed, updating the status of use in the data base corresponding to the user identifying information included in the print request, and a means for referring to and editing the data base in response to instruction from the outside registered in advance.

The print system according to the present invention has a security data base in which authority to use a shared printer can be set with respect to individual users and, in addition, status of use with respect to every user is recorded.

More specifically, the print system according to the present invention has a means for recording and maintaining authority of every user, a means for analyzing a print request, a means for checking authority of a user, and further, a means for recording the number of sheets consumed after printing with respect to each kind of paper or paper feeder, or, a means for recording statistical information with respect to each user indicating the number of times special printing functions such as printing on both sides and color printing are used.

Further, a printer driver in the print system according to the present invention has a means for changing the authority of users and referring to and editing statistical information of status of use of a printer with respect to the security data base.

The means for recording and maintaining authority of every user of the print system according to the present invention maintains a security data base in which authority of each user and statistical information of status of use of each user are put together. The means for analyzing a print request determines information such as the number of pages to be printed, which paper feeder is used, the type of paper, and special print features. The means for checking authority of a user compares the respective requests with data maintained in the security data base and carries out verification. Only if all of the requests are validated is the requested printing executed. After printing, the means for recording statistical information with respect to every user updates the security data base.

These means make it possible to set authority to use the shared printer not in a conventional way by merely determining whether allowable or not, but in various ways such as based on the accumulated number of printed pages, the number of pages with respect to every paper feeder or variety of pages, or special printing such as printing on both sides and color print.

Further, the means for checking authority of a user verifies authority to access sensitive data. In case of a user having management authority, by the means for changing the set authority of users and reading and modifying statistical information of status of use of a printer, the content of the security data base can be displayed and edited. The changes are recorded in the security data base by the means for recording statistical information with respect to every user. These means make it possible for a manager to set authority of a user. Further, information such as the number of pages printed on each kind of paper or how often double-sided printing or color printing is used can be provided a manager for each user.

BRIEF DESCRIPTION OF THE DRAWINGS

FIG. 3($a$) illustrates an example of the restrictions and the current status of use with respect to each kind of paper as stored in the security data base according to an embodiment of the present invention.

FIG. 3($b$) illustrates an example of the restrictions and the current status of use with respect to each special printing function as stored in the security data base according to an embodiment of the present invention.

DETAILED DESCRIPTION OF PREFERRED EMBODIMENTS

Figure 1:
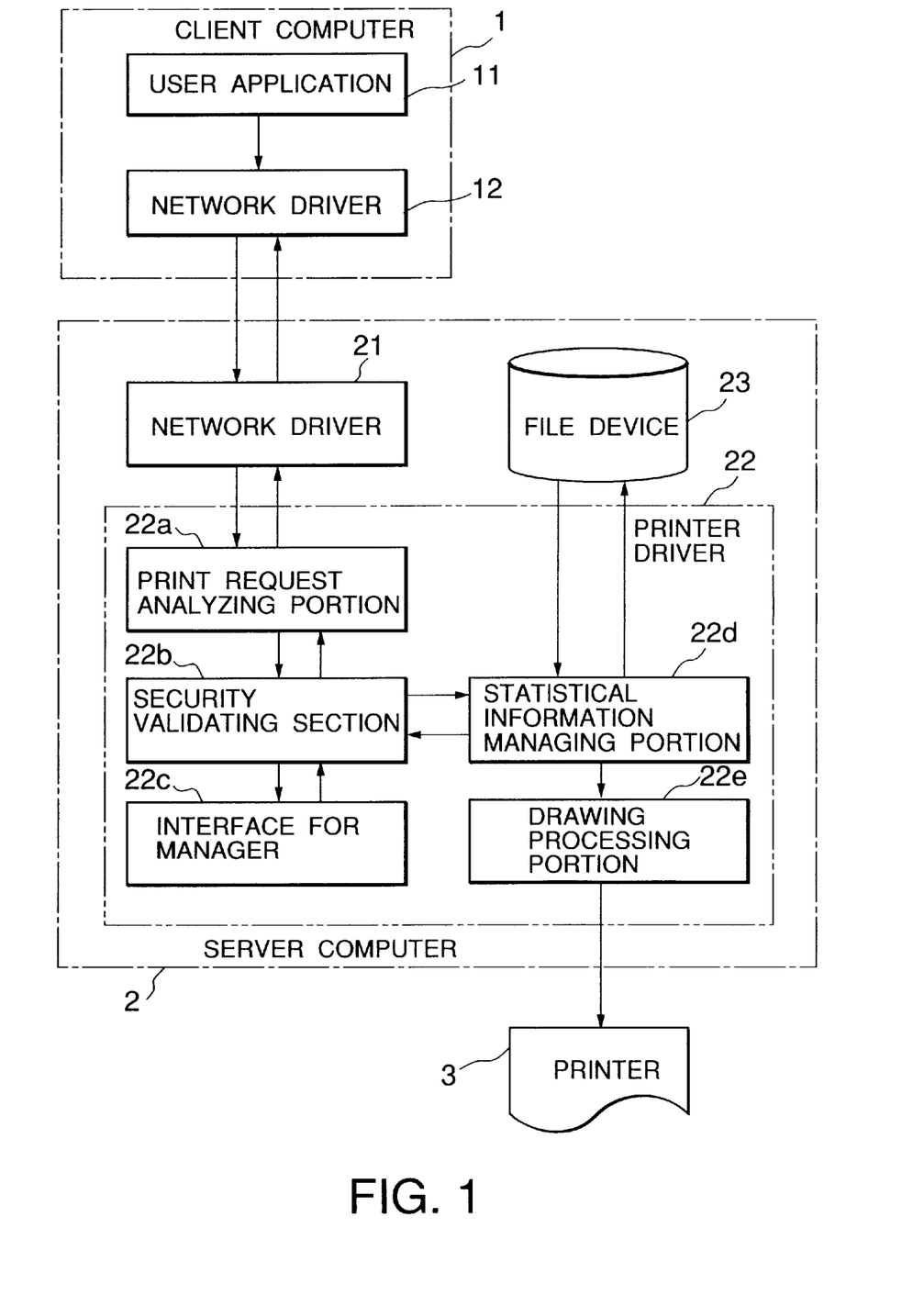
FIG. 1 is a block diagram illustrating architecture of an embodiment of the present invention.

With reference to FIG. 1, a client computer 1 is provided with a user application 11 and a network driver 12. A server computer 2 is provided with a network driver 21, a printer driver 22, and a file device 23. The printer driver 22 of the server computer 2 includes a print request analyzing portion 22$a$, a security validating portion 22$b$, an interface 22$c$ for a manager, a statistical information managing portion 22$d$, and a drawing processing portion 22$e$.

A document prepared by the user application 11 on the client computer 1 is transferred to the server computer 2 via the network drivers 12 and 21. The printer driver 22 of the server computer 2 analyzes, in the print request analyzing section 22$a$, a user ID (identifying information) and information such as the number of pages to print, the kind of paper, and special printing functions requested by the user.

The security validating portion 22$b$ sends the result of analysis by the print request analyzing portion 22$a$ to the statistical information managing portion 22$d$, which acquires information with regard to the user from a security data base maintained in the file device 23. The security validating portion 22$b$ compares the result of analysis by the print request analyzing portion 22$a$ with the information pertaining to the user, and, if requirements for printing are not satisfied, rejects the print request. In that case, the security validating portion 22$b$ transfers an error message to the client computer 1 via the network drivers 21 and 12 and informs the user of the error message.

On the other hand, if requirements for printing are satisfied, the drawing processing portion 22$e$ carries out print processing and a printer 3 prints the requested pages. When the printer 3 prints the pages, the statistical information managing portion 22$d$ adds the number of printed pages to the current total for the type of paper used and the current total for the number of times special printing functions have been used, as appropriate. The updated security data base is stored on the file device 23.

The security validating portion 22$b$ determines whether the user ID inputted from the interface 22$c$ for a manager is registered as a manager in the security data base or not. If the security validating portion 22$b$ validates authority to the user, the user is authorized to read and modify the security data base.

If the user is authorized to read and modify the data base, the statistical information managing portion 22$d$ acquires information with respect to all users from the data base on the file device 23, and outputs the data to the interface 22$c$ for a manager via the security validating portion 22$b$ or to the printer 3 via the drawing processing portion 22$e$.

When a user with management authority modifies the information with respect to all users in the security data base via interface 22$c$, the results are sent from the security validating portion 22$b$ to the statistical information managing portion 22$d$ to be stored in the security data base.

Operation of the embodiment of the present invention is described in the following with referenced to FIG. 1. The client computer (personal computer) 1 with a network adapter attached thereto (not shown) is connected with the server computer (personal computer) 2 via a network line (not shown).

The network drivers 12 and 21 operate as a part of an operating system on the client computer and the server computer 2, respectively, and data transfer from one to the other can be carried out. The printer 3 is connected with a printer port (not shown) of the server computer 2 via a printer cable (not shown) to be capable of receiving a print data.

The security data base is recorded on the file device (fixed disk) 23 on the server computer, and only the printer driver 22 on the server computer 2 can read and modify the security data base. It is to be noted that the printer driver 22 is stored in a memory (ROM: read only memory) (not shown) of the server computer 2.

Print data is stored on the file device 23 as a temporary file by the operating system from the network driver 21. The printer driver 22 reads the temporary file and acquires a user ID and print job information included therein.

The interface for manager 22$c$ is maintained in the memory as a part of the printer driver 22, acquires the user ID of the user logging in the server computer 2 with the operating system, and does not authorize a user to use the interface 22$c$ itself when the user does not have the appropriate authority.

Operation of the above described embodiment of the present invention is described in the following with reference to FIG. 1 and FIG. 2.

Figure 2:
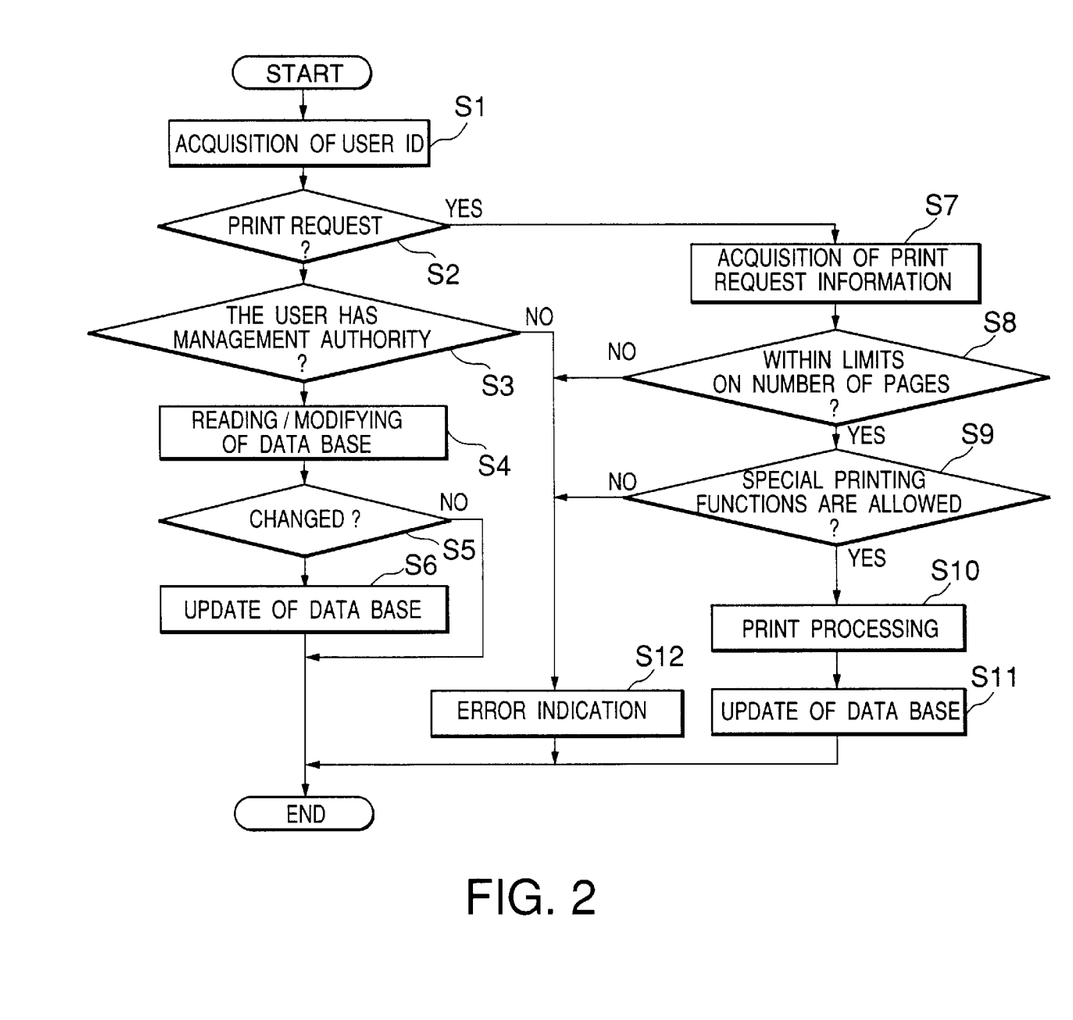
FIG. 2 is a flow chart illustrating operation of an embodiment of the present invention.

When a print request or a request to read and modify the security data base on the file device 23 is inputted from a user, the printer driver 22 operating on the server computer 2 acquires from the request the user ID of the requestor (step S1 in FIG. 2), then determines the type of request (whether it is a print request or not) (step S2 in FIG. 2).

If the request is a print request, the print request analyzing portion 22a judges from the print data the number of pages in the print job, which kind of paper or paper feeder (not shown) the user is requesting, and which, if any, special printing function is requested (step S7 in FIG. 2). With regard to the respective requests, the security validating portion 22b determines whether the requests are within the limits on the number of pages (step S8 in FIG. 2) and whether any requested special printing functions are allowed or not (step S9 in FIG. 2) based on the stored authority and statistical information of the user in the security data base, and decides authorization or non-authorization to print.

If the print request satisfies all the requirements, the security validating portion 22b authorizes printing by printer 3. If the print request fails to satisfy one or more of the requirements, the security validating portion 22b does not authorize the requested print job, and an error indication is given (step S12 in FIG. 2).

If printing is authorized, the drawing processing portion 22e carries out print processing with respect to the print data stored on the file device 23 as a temporary file and the printer 3 is activated (step S10 in FIG. 2). It is to be noted that, though whether the print request is within the restrictions on the number of sheets and whether the special printing is usable or not are judged in the above embodiment, if there is a restricting item other than the above restrictions, judgement is also made with respect to that restricting item between the step S9 and the step S10.

When the printer 3 prints, the statistical information managing portion 22d adds the number of printed pages with regard to each kind of paper or paper feeder and the number of times a special printing function is used to the cumulative total for these values, and updates the security data base with the result of the addition (step S11 in FIG. 2).

If the request is a request to read or modify the security data base, the security validating portion 22b checks whether the user has management authority (step S3 in FIG. 2), and if the user does not have the proper authority, an error indication is given (step S12 in FIG. 2). If the user has the proper authority, the user is allowed to read and modify the security data base via the interface 22c for a manager (step S4 in FIG. 2). If the user changes the content of the security data, (step S5 in FIG. 2), the security data base is updated with the changed content (step S6 in FIG. 2).

Figure 3A:
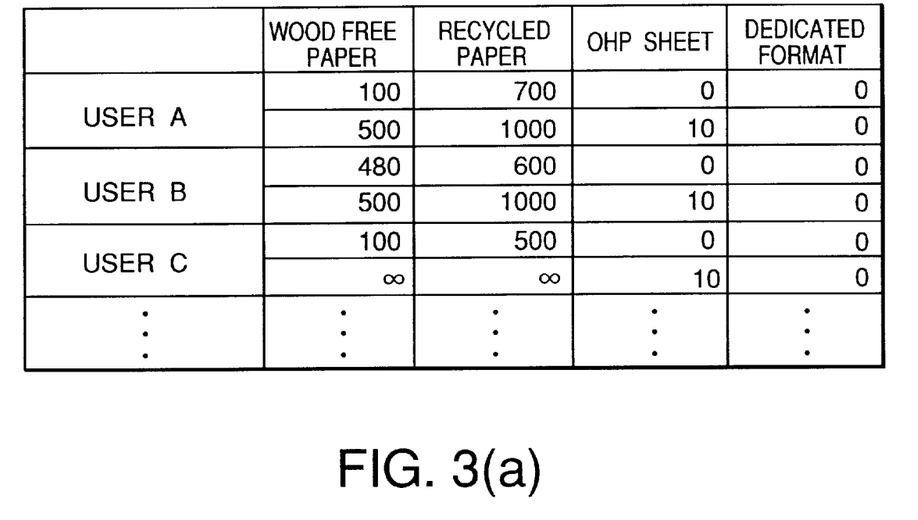

FIG. 3(a) shows restrictions with respect to each kind of paper as represented in the security data base according to an embodiment of the present invention. The maximum number of pages for user A and user B is the same. A maximum of "ø" indicates that the user has no authority to use such paper or feature, as is the case with "dedicated format" in FIG. 3(a).

A maximum of "∞", such as that shown for user C with respect to recycled paper indicates unlimited usage. If "∞" can not be set, a maximum number allowable by the software is used.

Based on the conditions represented by FIG. 3(a), if all the users A, B, and C make a request to print 30 pages using woodfree paper, user A, having thus far printed 100 pages, will not exceed the maximum of 500 by printing 30 additional pages, and is therefore authorized to print. After printing 30 pages of woodfree paper, the cumulative number of printed pages with regard to woodfree paper is: 100+30=130.

On the other hand, since the user B has already printed 480 pages of woodfree paper, and thus, the maximum number of pages of woodfree paper will be exceeded if an additional 30 pages are printed, the user B is not authorized to print and the print request is rejected. In addition to the error indication, user B is told to select printing only 20 pages on woodfree paper or print all (30 sheets) on recycled paper.

With respect to user C, since the maximum number of printable pages of woodfree paper for him is "∞," he is authorized to print. After this printing on woodfree paper, the cumulative page count for woodfree paper corresponding to the user C is updated in the same way as in the case of the user A: the current cumulative total of 100+additional 30=130.

Figure 3B:
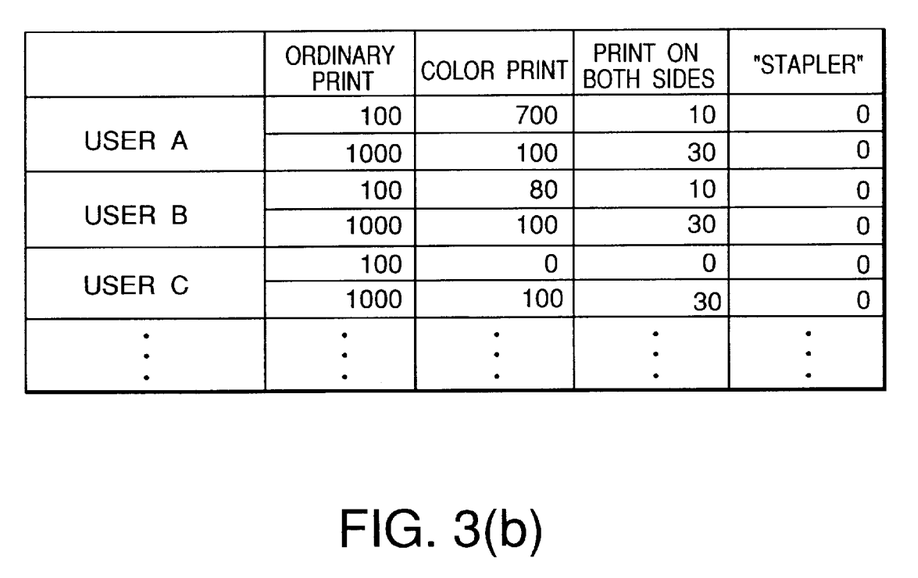

FIG. 3(b) shows restrictions with respect to every special printing function as represented in the security data base according to an embodiment of the present invention. The maximum number of pages is the same with regard to the users A, B, and C. Here, if the users A, B, and C each requests 30 pages of color printing, double-sided printing, and stapled pages, user A can use only color printing, user B can use none of the functions, and user C can not use the staple function, though he can use color printing and double-sided printing.

Figure 4:
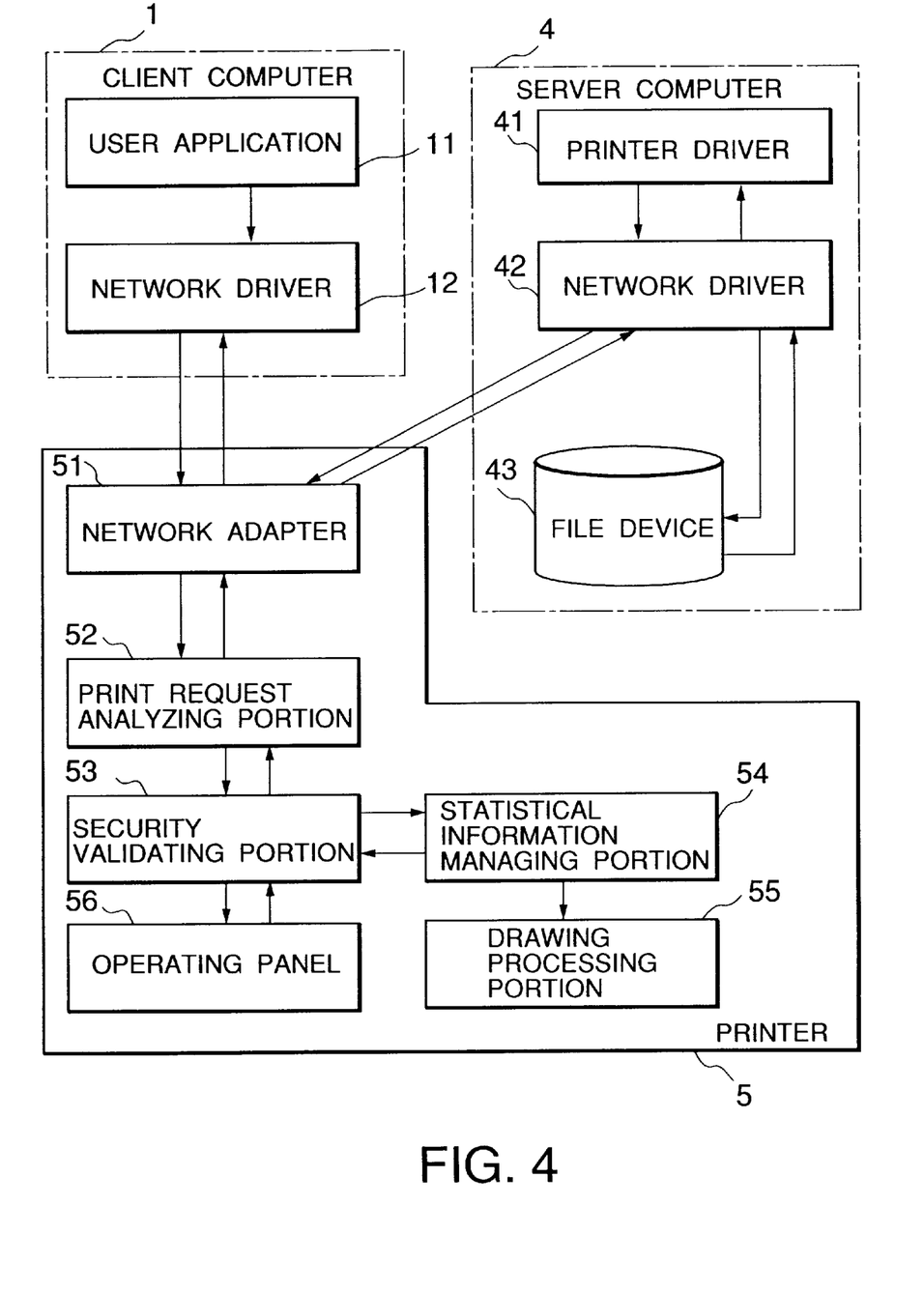
FIG. 4 is a block diagram illustrating architecture of another embodiment of the present invention.

FIG. 4 is a block diagram illustrating another embodiment of the present invention. In the figure, the client computer 1 is provided with the user application 11 and the network driver 12. A server computer 4 is provided with a network driver 41, a printer driver 42, and a file device 43. A printer 5 is provided with a network adapter 51, a print request analyzing portion 52, a security validating portion 53, a statistical information managing portion 54, a drawing processing portion 55, and an operating panel 56.

It is to be noted that the print request analyzing portion 52, the security validating portion 53, the statistical information managing portion 54, the drawing processing portion 55, and the operating panel 56 are structured and operated in the same way as elements 22a, 22b, 22d, 22e, and 22c of FIG. 1, respectively. While elements 22a, 22b, 22c, 22d, and 22e are maintained in the server computer 2, elements 52, 53, 54, 55, and 56 are maintained in a memory (ROM) in the printer 5. Reading and modifying the security data base by a manager is carried out via the operating panel 56.

The printer 5 uses the security data base on the file device 43 of the server computer 4 registered in advance, and validates printing as well as reading and modifying the security data base by a manager.

This embodiment of the present invention is different from the first embodiment in that various processing carried out by the print request analyzing portion 22a, the security validating portion 22b, the interface 22c for a manager, the statistical information managing portion 22d, and the drawing processing portion 22e provided in the printer driver 22 operating on the server computer 2 are executed in the printer 5, except that the file device 43 is managed by the printer driver 41 and the network driver 42 operating on the server computer 4. Accordingly, the load of various processing functions is moved to the printer 5, and thus, the load on the server computer 4 can be lightened.

Further, according to the previous embodiment of the present invention, if the printer 3 is detached from the server computer 2, printer 3 can be connected to and used with another computer (not shown). On the other hand, according to the present embodiment of the invention, since the file device 43 with the security data base is separated from security validating portion 53, it is impossible to separate the printer 5 from the server computer 4 and use it with another computer, preventing improper use of printer 5.

In this way, information indicating a range of authority, including a maximum number of printable pages, usable printer functions, and status of use of the printer by the user are stored in the security data base provided in the file device 23. Upon receipt of a print request, print validating means 22b or 53 analyzes the print request in light of the user ID and the information in the security data base to determine either authorization or non-authorization. The statistical information managing portion 22d or 54 updates the cumulative order in the security data base corresponding to the user ID after printing. When a user ID with manager authority is inputted from the interface 22c for a manager or the operating panel 56, the security data base may be read and modified. This way, restrictions on the number of printed pages or a usable printing functions with respect to every user can be placed and a manager can manage status of use of the printer 3 or 5.

The more paper a user consumes, the less that remains available. Thus, it is possible to make a user himself refrain from printing more than is necessary. For example, unnecessary consumption of expensive sheets such as woodfree paper and OHP sheets for printing drafts will decrease, which leads to reduced resources consumption and cost.

Accordingly, by setting limits as to number of printed pages based on paper type and paper feeder, the print characteristics can be changed automatically depending on the status of use by every user. Therefore, consumption of unnecessary pages can be prevented.

Further, since authority of a user can be adjusted, flexible handling is possible, for example, to increase the maximum number of printable pages with respect to a user who must print a great amount, so such a user will not run short. When accounting is made with respect to each type of paper, since a printing cost per page is different between color printing and monochrome printing, or between recycled paper and an OHP sheet, it is unfair to set a single rate per page. Since the number of printed pages with respect to every kind of paper and the number of times a special printing function is used are now known, fair accounting corresponding to actual cost can be made.

Accordingly, information concerning which user used how many pages of which kind of paper or how many times a special printing function has been used can be provided. This allows a manager to use past data when he resets the authority of a user, based on frequency of use. Further, as information is recorded with respect to every type of paper, statistical analysis may be performed.

What is claimed is:

1. A print system with a shared printer on a network, comprising:
   a data base for storing limitation information and print history information with respect to print characteristics, said limitation information and print history information being stored for respective users as identified by user identifying information, said limitation information including maximum sheet numbers of respective kinds of paper for respective users and said print history information including printed sheet numbers of the respective kinds of paper for respective users;
   a means for restricting access to said printer based on said limitation information, said print history information, and said user identifying information, and when a total of a requested number of sheets of a requested kind of paper plus the printed sheet number of the requested kind of paper exceeds the respective maximum sheet number of the requested kind of paper, for indicating an available number of sheets of the requested kind of paper or suggesting the requested number of sheets of a different kind of paper; and
   a means for reading and modifying said data base in response to externally provided instructions, said means for reading and modifying said data base modifies said maximum sheet numbers for respective users in said limitation information of said data base.

2. The print system of claim 1, wherein said access restriction means comprises:
   a means for validating an inputted print request based on contents of said print request, said user identifying information, and said contents of said data base, said print validation means providing either authorization or non-authorization for said print request; and
   a means for updating said print history if said print authorization is provided, by modifying said print history in said data base, based on said user identifying information and said print request.

3. The print system as claimed in claim 2, wherein said print history updating means comprises a means for adding a number of printed pages and a number of uses of special printer functions for said print request to said print history information.

4. The print system as claimed in claim 1, wherein said reading and modifying means comprises:
   a checking means for checking manager identifying information included in said externally provided instruction against manager identifying information stored in said data base; and
   a means for reading and modifying said limitation information and said print history information as specified by said externally provided instruction when said checking means verifies said manager identifying information.

5. The print system as claimed in claim 1, wherein:
   said limitation information includes data representing at least one of a maximum number of pages of each kind of paper, a maximum number of pages from respective paper feeders, and a maximum number of pages utilizing special printing function including at least a color printing function; and
   said print history information includes data representing at least one of a cumulative number of pages of each kind of paper, a cumulative number of pages from respective paper feeders, and a cumulative number of pages utilizing special printing functions which have already been printed.

6. The print system as claimed in claim 5, further comprising an interface for allowing said user to select whether to print on the kind of paper selected up to the maximum number for said kind of paper or to print entire print request on a different kind of paper, when the total number of pages in said print request plus said cumulative number of pages of said selected paper in said print history information exceeds said maximum number of pages of said selected paper in said limitation information.

7. A print system with a printer shared on a network and a server connected with said network for managing said printer, wherein said server comprises:
   a data base for storing limitation information including a maximum number of printed pages of respective kinds of paper and a maximum number of uses of special printer functions, said data base also storing print history information with respect to said number of printed pages of the respective kinds of paper and said uses of special printer functions, said limitation information and print history information being stored for respective users as identified by user identifying information;

a means for validating an inputted print request based on contents of said print request, said user identifying information, and said contents of said data base, said print validation means providing either authorization or non-authorization for said print request, and when a total of a requested number of sheets of a requested kind of paper plus the printed sheet number of the requested kind of paper exceeds the respective maximum sheet number of the requested kind of paper, for indicating an available number of sheets of the requested kind of paper or suggesting the requested number of sheets of a different kind of paper;

a means for updating said print history if said print authorization is provided, by modifying said print history in said data base, based on said user identifying information and said print request; and a means for reading and modifying said data base in response to externally provided instructions, said means for reading and modifying said data base modifies said maximum sheet numbers and maximum use numbers for respective users in said limitation information of said data base.

8. A print system with a printer shared on a network and a server connected with said network for managing said printer, wherein said server comprises:

a data base for storing limitation information including a maximum number of printed pages of respective kinds of paper and a maximum number of uses of special printer functions, said data base also storing print history information with respect to said number of printed pages of the respective kinds of paper and said uses of special printer functions, said limitation information and print history information being stored for respective users as identified by user identifying information;

and wherein said printer comprises:

a means for validating an inputted print request based on contents of said print request, said user identifying information, and said contents of said data base, said print validation means providing either authorization or non-authorization for said print request, and when a total of a requested number of sheets of a requested kind of paper plus the printed sheet number of the requested kind of paper exceeds the respective maximum sheet number of the requested kind of paper, for indicating an available number of sheets of the requested kind of paper or suggesting the requested number of sheets of a different kind of paper;

a means for updating said print history if said print authorization is provided, by modifying said print history in said data base, based on said user identifying information and said print request; and a means for reading and modifying said data base in response to externally provided instructions, said means for reading and modifying said data base modifies said maximum sheet numbers and maximum use numbers for respective users in said limitation information of said data base.

9. A security management method for a print system with a printer shared on a network, comprising the steps of:

storing into a data base limitation information and print history information with respect to print characteristics, said limitation information and print history information corresponding to user identifying information for specifying a user of said printer into a data base, said limitation information including maximum sheet numbers of respective kinds of paper for respective users and said print history information including printed sheet numbers of the respective kinds of paper for respective users;

validating an inputted print request to determine whether said print request is to be authorized or not, said validating being based on said print request and said limitation information and said print history information corresponding to said user identifying information;

indicating an available number of sheets of the requested kind of paper or suggesting the requested number of sheets of a different kind of paper when a total of a requested number of sheets of a requested kind of paper plus the printed sheet number of the requested kind of paper exceeds the respective maximum sheet number of the requested kind of paper;

updating said print history information in said data base corresponding to said user identifying information included in said print request after printing according to said print request is executed; and referring to and modifying said data base, including the maximum sheet numbers for respective users, in response to instruction from the outside registered in advance.

10. The security management method of claim 9, wherein said print characteristics include at least one of color printing, double-sided printing, automatic stapling, printing on woodfree paper, printing on recycled paper, printing on OHP sheet and printing with a dedicated format.

11. The security management method of claim 10, wherein the print request validation step includes adding a number of pages in the print request to said print history information regarding a number of pages already printed of a requested kind, and executing said print request if a sum of said addition is not greater than said maximum number of allowed pages of said requested kind.

12. The security management method of claim 11, wherein the updating step includes adding the number of printed pages with regard to each kind of paper and the number of times a special printing function is used to the print history information for these values and storing the updated print history information in the data base.

* * * * *